US009424382B1

(12) United States Patent
Titley (10) Patent No.: US 9,424,382 B1
(45) Date of Patent: Aug. 23, 2016

(54) METHOD AND APPARATUS FOR PROVIDING FAULT TOLERANCE THROUGH COMPILATION DIVERSITY

(71) Applicant: Altera Corporation, San Jose, CA (US)

(72) Inventor: Adam Titley, Bracknell (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/085,757

(22) Filed: Nov. 20, 2013

(51) Int. Cl.
*G06F 17/50* (2006.01)
(52) U.S. Cl.
CPC .................... *G06F 17/505* (2013.01)
(58) Field of Classification Search
CPC .................. G06F 17/5045; G01R 31/318536; G01R 31/3183; G01R 31/31878
USPC .......................... 716/101, 103, 104, 106, 111
See application file for complete search history.

(56) References Cited

U.S. PATENT DOCUMENTS

| 7,337,100 | B1 * | 2/2008 | Hutton et al. ................... 703/13 |
| 7,412,674 | B1 * | 8/2008 | Singhal et al. ................ 716/106 |
| 7,562,328 | B1 * | 7/2009 | Phaik ............................. 716/103 |
| 2004/0133869 | A1 * | 7/2004 | Sharma .......................... 716/16 |
| 2011/0283250 | A1 * | 11/2011 | Manohararajah ............ 716/132 |
| 2013/0159950 | A1 * | 6/2013 | Lin et al. ...................... 716/113 |
| 2013/0283224 | A1 * | 10/2013 | Lin et al. ...................... 716/113 |

* cited by examiner

*Primary Examiner* — Brian Ngo
(74) *Attorney, Agent, or Firm* — L. Cho (57) ABSTRACT

A method for designing a system on a target device includes synthesizing a logic representation of a processing channel from a description of the processing channel in hardware description language (HDL) according to a first set of constraints. A logic representation for a redundant processing channel is synthesized from the description of the processing channel in HDL according to a second set of constraints. The processing channel and the redundant processing channel are placed and routed.

24 Claims, 8 Drawing Sheets

Logical representation of functions in a channel

FIG. 5A

Placement of channels within a device

Overall path delay = Logic delay + routing delay

METHOD AND APPARATUS FOR PROVIDING FAULT TOLERANCE THROUGH COMPILATION DIVERSITY

FIELD

Embodiments of the present invention relate to tools for designing systems on target devices. More specifically, embodiments of the present invention relate to a method and apparatus for providing fault tolerance through compilation diversity in a design compilation flow.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device.

System designs frequently implement a plurality of different processing channels. Processing channels may include the logic and routing used for performing one or more specific functions. Examples of processing channels include processors, controllers, filters, communication interfaces, and other devices. Processing channels may be implemented using pre-designed blocks of logic (intellectual property (IP) cores) or logic designed by a user.

Systems implemented on target devices operating in environments exposed to ionizing energies may be susceptible to faults. System upsets may range from a minor event such as erroneous data to catastrophic disruption of operation. In order to decrease error cross sections and satisfy safety critical requirements, redundancies may built in to provide for fault tolerance. Some systems provide for a duplicate of a critical processing channel where the outputs of the critical processing channels are compared to determine whether a fault has occurred.

SUMMARY

A method and apparatus for providing fault tolerance through compilation diversity is disclosed. In order to reduce common cause failures that may result in a processing channel and a redundant processing channel, the processing channel and redundant processing channel are implemented differently such that a cause of failure affecting one processing channel may not affect the other. According to an embodiment of the present invention, a single design for a processing channel is provided in hardware description language (HDL). Diversity in creating and/or implementing a second processing channel may be performed automatically by a system designer/EDA tool by performing synthesis, placement, and/or routing on the two processing channels differently.

According to a first embodiment of the present invention, a method for designing a system on a target device includes synthesizing a logic representation for a processing channel from a description of the processing channel in HDL according to a first set of constraints. A logic representation for a redundant processing channel is synthesized from the description of the processing channel in HDL according to a second set of constraints. The processing channel and the redundant processing channel are then placed and routed.

According to a second embodiment of the present invention, a method for designing a system on a target device includes generating a processing channel from a description of the processing channel in HDL. A redundant processing channel is generated from a description of the redundant processing channel in HDL, wherein in response to identifying a redundant pairing of the processing channel and the redundant processing channel as a redundant set, the processing channel is generated according to a first set of constraints and the redundant processing channel is generated according to a second set of constraint.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
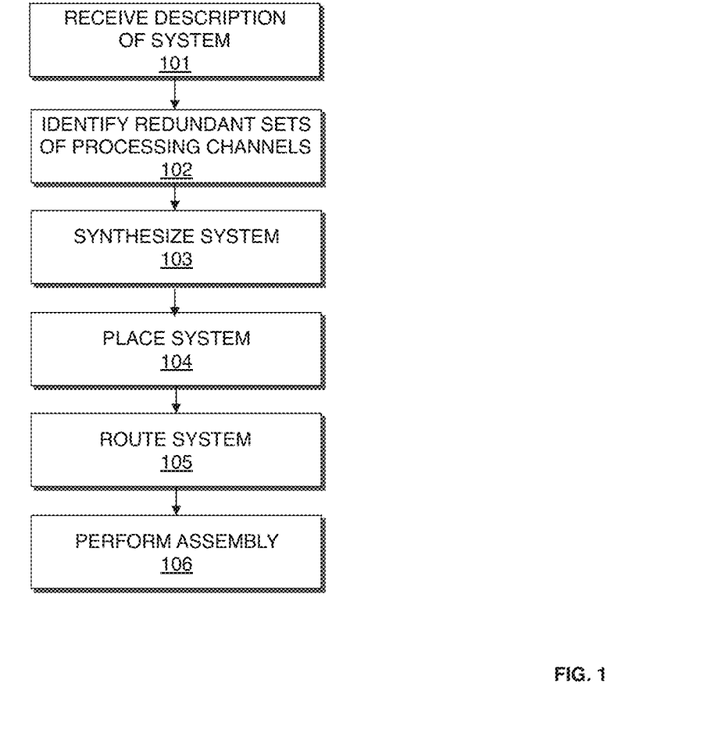
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, a description of a system is received by the EDA tool. According to an embodiment of the present invention, the description of the system may be in hardware description language (HDL) format provided by a user or by another tool. The description may include components defined by user generated logic ("user logic"). The description may also or alternatively include pre-designed logic in the system.

At 102, redundant sets of processing channels in the system are identified. According to an embodiment of the present invention, when both a processing channel and a redundant processing channel are present in a description of a system, the EDA tool may identify the pairing of the processing channel and the redundant processing channel as a redundant set from an indication provided by the user. Alternatively, the EDA tool may identify the pairing of the processing channel and the redundant processing channel as a redundant set independently by analyzing the structure and/or functionality of the channels. When a processing channel is present in a description of a system without a redundant processing channel, the user may provide an indication to the EDA tool that redundancy for the processing channel is desired. Furthermore, in either cases, the user has the option of specifying whether diversity is desired when generating the processing channel and the redundant processing channel, whether diversity is desired in the channels through synthesis, placement, and/or routing, and what constraints should be applied during synthesis, placement, and/or routing in order to achieve diversity between the channels. According to an embodiment of the present invention, when the user does not provide any specification, a default may be exercised where redundancy is provided using default settings and default constraints.

Processing channels in a redundant set perform the same functionality. The inputs into each of the processing channels are common. When functioning correctly, without experiencing a fault, their outputs should be identical. According to an embodiment of the present invention, when one or more redundant processing channels are used, the outputs of the processing channels are compared to determine whether one of the processing channels is not functioning properly. When more than one redundant processing channels are used, a voting unit may be implemented to identify which of the processing channels is not functioning properly and appropriate actions may be taken to utilize the output of a properly functioning processing channel. When a single redundant processing channel is used, a system may be put into a safe state when it is determined that one of the processing channels is not functioning properly.

At 103, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. According to an embodiment of the present invention, a netlist is generated from mapping. This netlist may be an optimized technology-mapped netlist generated from the HDL.

During synthesis, a logical representation is synthesized for a processing channel from a description of the processing channel in HDL according to a set of synthesis constraints, and a logic representation is synthesized for a redundant processing channel from a description of the redundant processing channel in HDL according to a different set of synthesis constraints. When a redundant processing channel is not described in HDL, but the user has indicated that a redundant processing channel is desired, the logical representation for the redundant processing channel may be generated automatically during synthesis. Synthesizing the processing channel and the redundant processing channel with different sets of synthesis constraints ensures that the channels are synthesized differently to provide diversity.

At 104, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device.

During placement, the processing channel may be placed according to a set of placement constraints, and the redundant processing channel may be placed according to a different set of placement constraints. According to an embodiment of the present invention, the placement constraints may impose a predetermined distance between the placement of the processing channel and the redundant processing channel or impose other restrictions. Placing the processing channel and the redundant processing channel with different sets of placement constraints ensures that the channels are placed differently to provide diversity.

At 105, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

During routing, the processing channel may be routed according to a set of routing constraints, and the redundant processing channel may be routed according to a different set of routing constraints. According to an embodiment of the present invention, the routing constraints may require that the processing channel and the redundant processing channel be implemented using different types or classes of routing resources, and/or impose different timing constraints on the channels. Routing the processing channel and the redundant processing channel with different sets of routing constraints ensures that the channels are routed differently to provide diversity.

At 106, an assembly procedure is performed. The assembly procedure involves creating a data file that includes information determined by the procedures described at 101-105. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system, which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2:
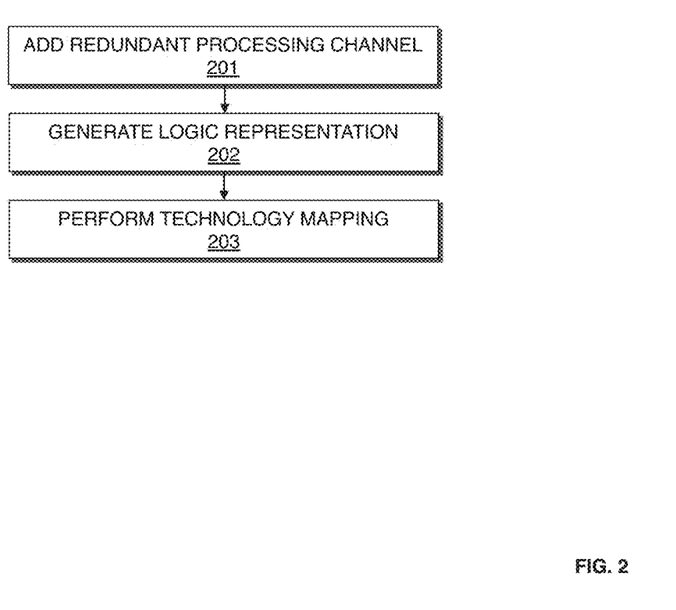
FIG. 2 is a flow chart illustrating a method for performing synthesis according to an exemplary embodiment of the present invention.

FIG. 2 is a flow chart illustrating a method for performing synthesis according to an exemplary embodiment of the present invention. The procedures illustrated in FIG. 2 may be used to implement procedure 103 in FIG. 1. At 201, a redundant processing channel is added to the system design. According to an embodiment of the present invention, the redundant processing channel is generated in response to an indication provided by a user that redundancy is desired for an existing processing channel. It should be appreciated that one or more redundant processing channels may be added in response to the indication. It should also be appreciated that additional circuitry to support the redundancy, such as an output comparator to evaluate the output from the channels and a voting selector to determine which channel is functioning properly from outputs of the channels, may also be added. The processing channel and the one or more redundant processing channels are identified as a redundant set.

At 202, a logic representation of the system is generated. Different sets of constraints are applied to processing channels in a redundant set to allow the process channel and the redundant processing channel to be generated differently. According to an embodiment of the present invention, the synthesis constraints may specify that the processing channels in a redundant set register data differently and position registers along paths of the processing channels differently to create temporal diversity. Synthesis constraints may also specify that one processing channel be synthesized in a manner to reduce its size at the detriment to speed and performance while another processing channel be synthesized to optimize its speed and performance at the cost of requiring more registers and increasing its footprint. It should be appreciated that other synthesis constraints specifying different logic representation generation strategies may be apply to the processing channel and redundant processing channel to create diversity in the logic representations.

At 203, the optimized logic design is mapped. Mapping includes determining how to implement logic gates and logic elements in the optimized logic representation with specific resources on the target device. According to an embodiment of the present invention, the synthesis constraints may specify a first type of resources on the target device to implement the processing channel and a second type of resources on the target device, unused by the processing channel, to implement the redundant processing channel. The first type of resources may be a first type of look up table (LUT) and the second type of resources may be a second type of LUT. It should be appreciated that other synthesis constraints specifying different mapping strategies to apply to the processing channel and redundant processing channel may be used to create diversity in the mapping.

FIGS. 1 and 2 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques. For example, FIG. 1 describes an exemplary embodiment where different sets of constraints may be applied to the processing channel and redundant processing channel during synthesis, placement, and routing. It should be appreciated that diversity may be achieved by applying different sets of constraints at only one of the synthesis, placement, and routing procedures.

The procedures described with reference to FIGS. 1 and 2 allow processing channels to be generated with diversity. According to an embodiment of the present invention, diversity may be achieved, for example, by having each channel be implemented using a different logic design, different types of components on a target device, placed outside a predetermined location from each other on the target device, and/or routed to achieve different timing requirements. Adding diversity to redundant processing channel designs provides protection against a common cause of failure affecting a regular processing channel and allows the system to be more fault tolerant. Embodiments of the present invention provide diversity for redundant processing channel without requiring a user to add design changes. Instead, embodiments of the present invention utilizes the existing HDL describing the processing channel and applies different synthesis, placement, and/or routing constraints to the processing channels to create the diversity. Since diversity is created by the EDA tool/system designer, diverse processing channels may be created from a single source file (the HDL description of the system). This conserves design time. According to an embodiment of the present invention, the user is allowed to provide input to specify the constraints and manner in which diversity is created.

Figure 3:
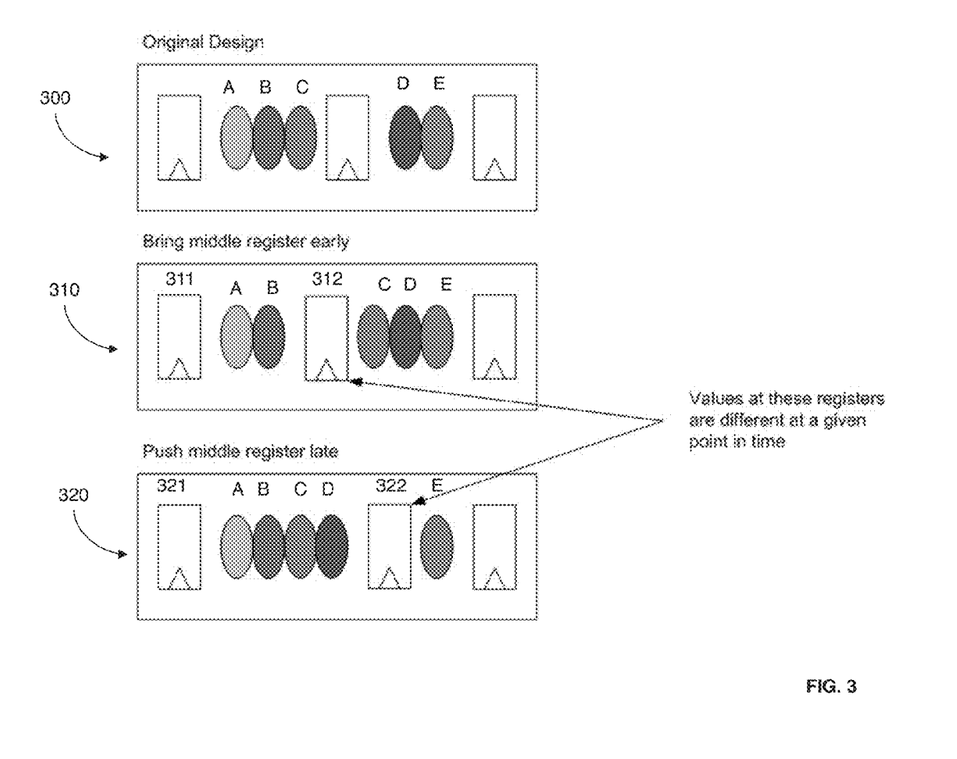
FIG. 3 illustrates an example of processing channels with temporal diversity created during synthesis according to an exemplary embodiment of the present invention.

FIG. 3 illustrates an example of processing channels with temporal diversity created during synthesis according to an exemplary embodiment of the present invention. An embodiment of the present invention, synthesizes the HDL description of an original design 300 of the processing channel into a first processing channel 310 and a second processing channel 320. The first processing channel 310 may operate as the primary processing channel and the second processing channel 320 may operate as the redundant processing channel. A first set of synthesis processing constraints are applied to synthesize the first processing channel 310 and a second set of synthesis processing constraints are applied to the synthesize the second processing channel 320 such that the first processing channel 310 and the second processing channel 320 are unique. Although both processing channels utilize logic A, B, C, D, and E, and both processing channels utilize 3 registers, the processing channels are generated with temporal diversity in the manner they register data. As shown, the first processing channel 310 utilizes register 311 to register data before transmitting the data to logic A and utilizes register 312 to register data output from logic B before transmitting the data to logic C. The second processing channel utilizes register 321 to register data before transmitting the data to logic A and utilizes register 322 to register data output from logic D before transmitting the data to logic E.

Figure 4:
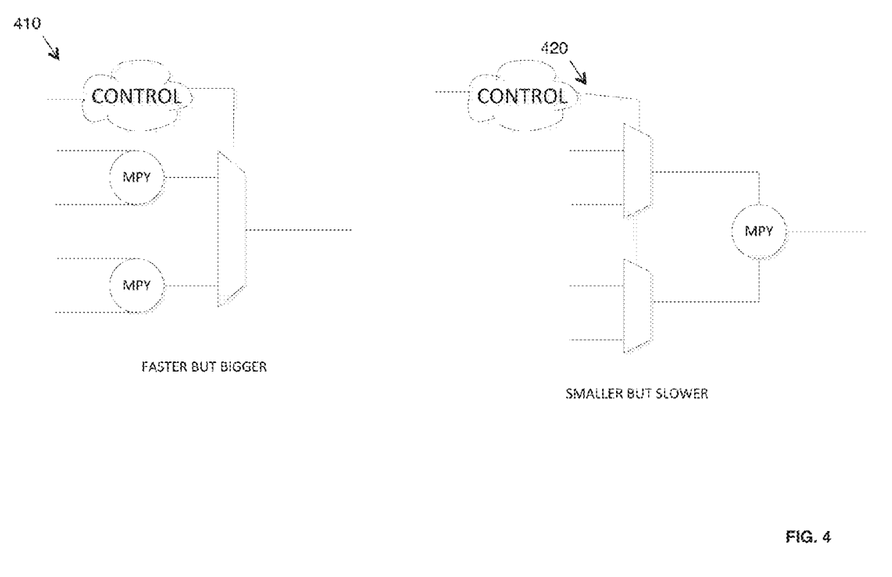
FIG. 4 illustrates an example of processing channels with structural diversity created during synthesis according to an exemplary embodiment of the present invention.

FIG. 4 illustrates an example of processing channels with structural diversity created during synthesis according to an embodiment of the present invention. On the left, a first processing channel 410 designed for performance is illustrated. In the first processing channel 410, control processing is performed in parallel with the delay through the multiplier (MPY) components. On the right, a second processing channel 420 designed for area conservation is illustrated. In the second processing channel 420, control processing is performed serially. As shown in the second processing channel 420, control processing needs to be completed before the multiplier may process data. However, since only one multiplier block, the second processing channel requires less area on a target device to implement.

Figure 5A:
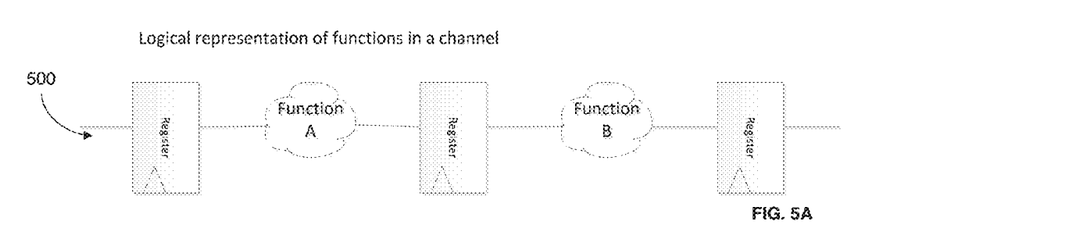
FIGS. 5A and 5B illustrate an example of processing channels with placement diversity created during placement according to an exemplary embodiment of the present invention.
Figure 5B:
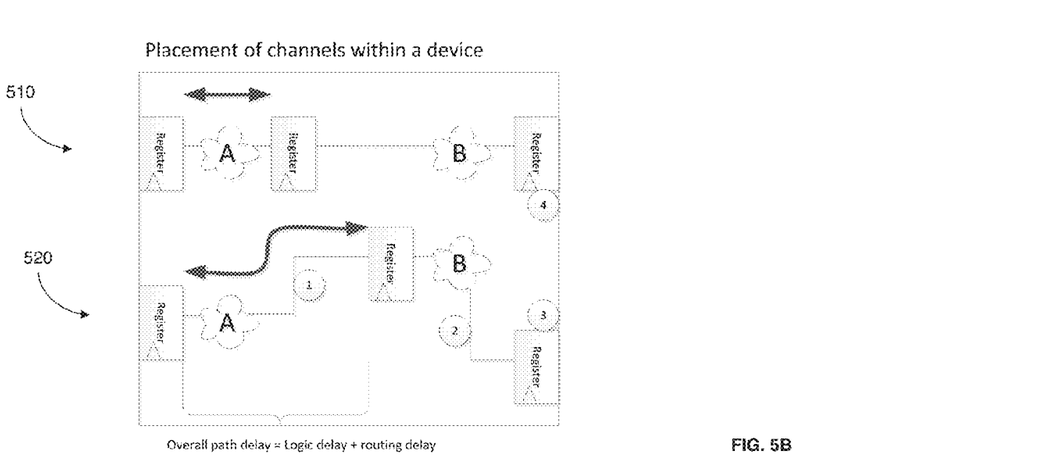

FIGS. 5A and 5B illustrate an example of processing channels with placement diversity created during placement according to an exemplary embodiment of the present invention. FIG. 5A illustrates a logical representation of functions in a processing channel 500. FIG. 5B illustrates two different examples of placement solutions for the processing channel on a target device. The first placement solution 510 places a first processing channel on the top. The first placement solution 510 includes a path with a function A that uses only horizontal routing channels. The first placement solution 510 also places registers close to function A. This provides an optimal solution.

The second placement solution 520 places a second processing channel on the bottom. The second placement solution 520 includes a path with a function A that uses both horizontal and vertical routing channels. The second placement solution also places registers further apart from function A. In order to implement the second placement solution 520, additional routing multiplexers (not shown) and routing channels are required which result in greater delay on the path of the second processing channel. As such, although function A is identical in both the first placement solution 510 and the second placement solution 520, the channel in the second placement solution 520 may now be the critical path due to longer routing paths. It should be appreciated that register 4 on the first processing channel and register 3 on the second processing channel may be connected to different input output banks associated with different power supplies. This would add further diversity at the output.

Figure 6:
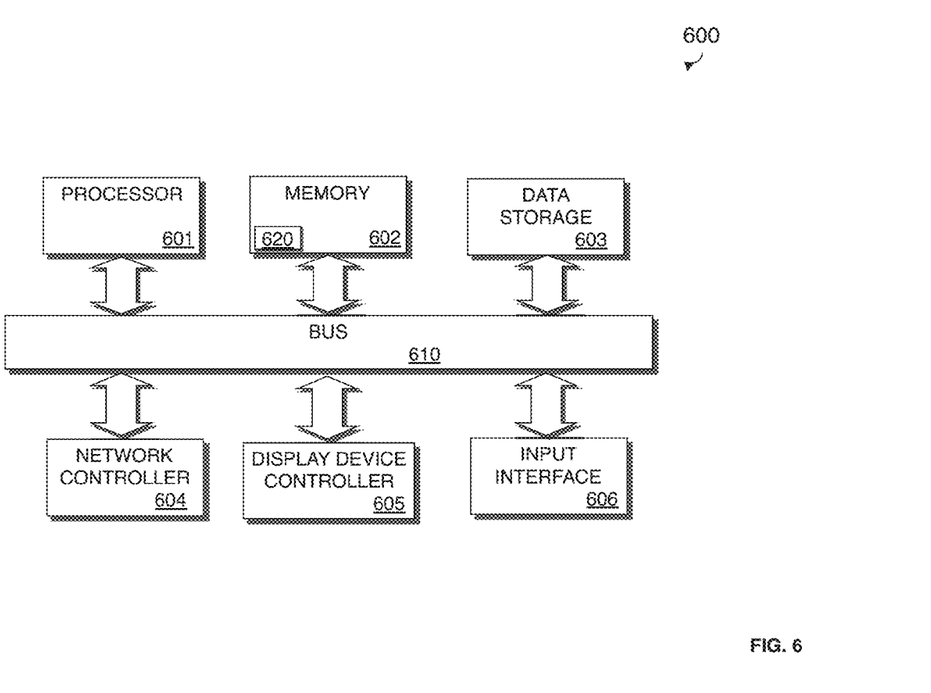
FIG. 6 illustrates a block diagram of a computer system implementing a system designer according to an embodiment of the present invention.

FIG. 6 is a block diagram of an exemplary computer system 600 in which an example embodiment of the present invention resides. The computer system 600 may be used to implement a system designer such as an EDA tool. The computer system 600 includes a processor 601 that processes data signals. The processor 601 is coupled to a bus 610 that transmits data signals between components in the computer system 600. The bus 610 may be a single bus or a combination of multiple buses. The computer system 600 includes a memory 602. The memory 602 may be a dynamic random access memory device, a static random access memory device, and/or other memory device. The memory 602 may store instructions and code represented by data signals that may be executed by the processor 601. A data storage device 603 is coupled to the bus 610. The data storage device 603 may be a hard disk drive, a floppy disk drive, a CD-ROM device, a flash memory device or other mass storage device.

A network controller 604 is coupled to the bus 610. The network controller 604 may link the computer system 600 to a network of computers (not shown) and supports communication among the machines. A display device controller 605 is coupled to the bus 610. The display device controller 605 allows coupling of a display device (not shown) to the computer system 600 and acts as an interface between the display device and the computer system 600. An input interface 606 is coupled to the bus 610. The input interface 606 may be, for example, a keyboard and/or mouse controller or other input interface. The input interface 606 allows coupling of an input device to the computer system 600 and transmits data signals from an input device to the computer system 600. It should be appreciated that computer systems having a different architecture or having different components may also be used to implement the computer system 600.

According to an embodiment of the present invention, a system designer 620 may reside in memory 602 and be executed by the processor 601. The system designer 620 may operate to generate a processing channel from a description of the processing channel in HDL and generate a redundant processing channel from a description of the redundant processing channel in HDL or alternatively from the description of the processing channel in response to an indication that redundancy is desired. In response to identifying a redundant pairing of the processing channel and the redundant processing channel, the processing channel is generated according to a first set of constraints and the redundant processing channel is generated in response to a second set of constraints. The first and second set of constraints may be synthesis, placement, and/or routing constraints which allow the processing channels to be generated with diversity. The diversity may be reflected in a difference in logic design, types of components used for implementation, location of placement on the target device, routing to achieve different timing requirements, and/or other characteristics.

Figure 7:
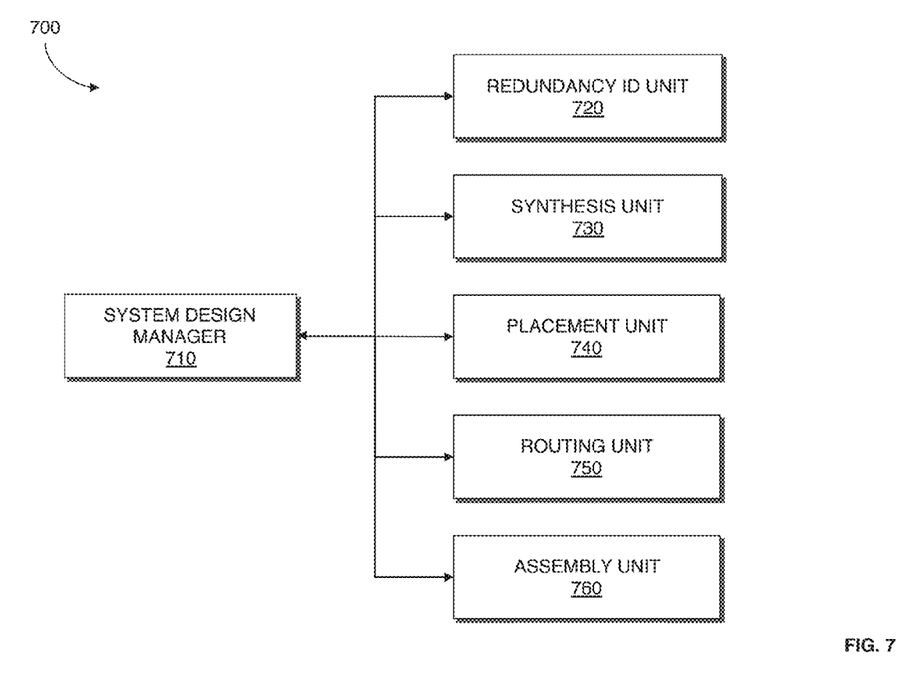
FIG. 7 illustrates a block diagram of a system designer according to an embodiment of the present invention.

FIG. 7 illustrates a system designer 700 according to an embodiment of the present invention. The system designer 700 may be an EDA tool for designing a system on a target device such as an FPGA, structured application-specific integrated circuit (ASIC), ASIC, or other circuitry. FIG. 7 illustrates modules implementing an embodiment of the system designer 700. According to one embodiment, the modules represent software modules and system design may be performed by a computer system such as the one illustrated in FIG. 6 executing sequences of instructions represented by the modules shown in FIG. 7. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 700 includes a system designer manager 710. The designer system manager 710 is connected to and transmits data between the other components of the system designer 700. The system designer manager 710 provides an interface that allows a user to input data into the system designer 700. According to an embodiment of the present invention, a description of a system may be input into the system designer by the user. The description of the system may be in HDL format provided by the user or by another tool. The description may include components defined by user generated logic ("user logic"). The description may also or alternatively include pre-designed logic in the system.

The system designer 700 includes a redundancy identifier unit 720. The redundancy identifier unit 720 is operable to identifying redundant sets of processing channels in the system. According to an embodiment of the present invention, when both a processing channel and a redundant processing channel are present in a description of a system, the redundancy identifier unit 720 may identify the pairing of the processing channel and the redundant processing channel as a redundant set from an indication provided by the user. Alternatively, the redundancy identifier unit 720 may identify the pairing of the processing channel and the redundant processing channel as a redundant set independently by analyzing the structure and/or functionality of the channels.

It should be appreciated that when a processing channel is present in a description of a system without a redundant processing channel, the user may provide an indication that redundancy for the processing channel is desired via the system design manager 710. The user has the option of specifying to the system design manager 710 whether diversity is desired when generating the processing channel and the redundant processing channel, whether diversity is desired in the channels through synthesis, placement, and/or routing, and what constraints should be applied during synthesis, placement, and/or routing in order to achieve diversity between the channels.

The system designer 700 includes a synthesis unit 730. The synthesis unit 730 generates a logic design of the system to be implemented by the target device. According to an embodiment of the present invention, the synthesis unit 730 generates an optimized logical representation of the system from the HDL design definition and maps the optimized logic design. According to an embodiment of the present invention, a netlist is generated from mapping. This netlist may be an optimized technology-mapped netlist generated from the HDL.

According to an embodiment of the present invention, the synthesis unit 730 generates a logical representation for a processing channel from a description of the processing channel in HDL according to a set of synthesis constraints, and generates a logic representation for a redundant processing channel from a description of the redundant processing channel in HDL according to a different set of synthesis constraints. When a redundant processing channel is not described in HDL, but the user has indicated that a redundant processing channel is desired, the logical representation for the redundant processing channel may be generated automatically by the synthesis unit 730. Synthesizing the processing channel and the redundant processing channel with different sets of synthesis constraints ensures that the channels are synthesized differently to provide diversity.

The system designer includes a placement unit 740. According to an embodiment of the present invention, the placement unit 740 places the mapped logical system design on the target device. Placement works on the technology-mapped netlist to produce a placement for each of the functional blocks. According to an embodiment of the present invention, placement unit 740 fits the system on the target device by determining which resources on the logic design are to be used for specific logic elements, and other function blocks determined to implement the system as determined during synthesis. Placement may include clustering which involves grouping logic elements together to form the logic clusters present on the target device.

According to an embodiment of the present invention, the placement unit 740 places the processing channel according to a set of placement constraints, and places the redundant processing channel according to a different set of placement constraints. The placement constraints may impose a predetermined distance between the placement of the processing channel and the redundant processing channel. Placing the processing channel and the redundant processing channel with different sets of placement constraints ensures that the channels are placed differently to provide diversity.

The system designer 700 includes a routing unit 750 which routes the placed design on the target device. The routing unit 750 allocates routing resources on the target device to provide interconnections between logic gates, logic elements, and other components on the target device. The routing unit 750 may also perform routability optimization on the placed logic design.

According to an embodiment of the present invention, the routing unit 750 routes the processing channel according to a set of routing constraints, and routes the redundant processing channel according to a different set of placement constraints. The routing constraints may require that the processing channel and the redundant processing channel be implemented using different types or classes of routing resources, and/or impose different timing constraints on the channels. Routing the processing channel and the redundant processing channel with different sets of routing constraints ensures that the channels are routed differently to provide diversity.

The system designer 700 includes an assembly unit 760 that performs an assembly procedure that creates a data file that includes the design of the system generated by the system designer 700. The data file may be a bit stream that may be used to program the target device. The assembly unit 760 may output the data file so that the data file may be stored or alternatively transmitted to a separate machine used to program the target device. It should be appreciated that the assembly unit 760 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 8:
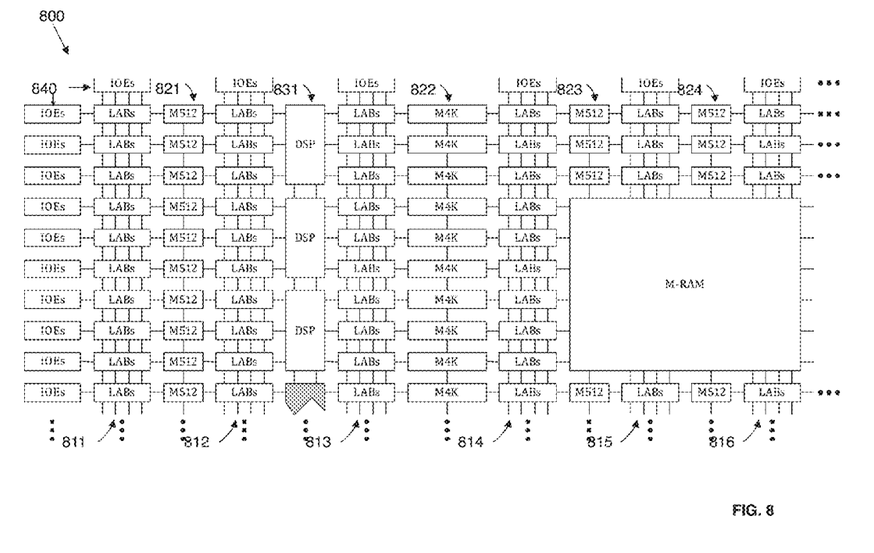
FIG. 8 illustrates an exemplary target device according to an embodiment of the present invention.

FIG. 8 illustrates a device 800 that may be used to implement a target device according to an embodiment of the present invention. The device 800 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 800. Columns of LABs are shown as 811-816. It should be appreciated that the logic block may include additional or alternate components.

The device 800 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 800. Columns of memory blocks are shown as 821-824.

The device 800 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 800 and are shown as 831.

The device 800 includes a plurality of input/output elements (IOEs) 840. Each IOE feeds an IO pin (not shown) on the device 800. The IOEs 840 are located at the end of LAB rows and columns around the periphery of the device 800. Each IOE may include a bidirectional IO buffer and a plurality of registers for registering input, output, and output-enable signals.

The device 800 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
    synthesizing a logic representation of a processing channel from a description of the processing channel in hardware description language (HDL) according to a first set of constraints;
    synthesizing a logic representation of a redundant processing channel, functionally equivalent to the processing channel, from the description of the processing channel in HDL according to a second set of constraints, wherein the first set and the second set of constraints include synthesis constraints; and
    placing and routing the processing channel and redundant processing channel, wherein the synthesizing is performed by a synthesis unit.

2. The method of claim 1, wherein synthesizing the logic representation of the processing channel according to the first set of constraints and synthesizing the logic representation for the redundant processing channel according to the second set of constraints causes the logic representation for the processing channel and the redundant processing channel to be structurally different.

3. The method of claim 1, wherein synthesizing the logic representation of the processing channel according to the first set of constraints and synthesizing the logic representation for the redundant processing channel according to the second set of constraints causes the logic representation for the processing channel to register data differently than the logic representation for the redundant processing channel.

4. The method of claim 1, wherein synthesizing the logic representation of the processing channel according to the first set of constraints and synthesizing the logic representation for the redundant processing channel according to the second set of constraints causes the processing channel to be implemented with a first type of resources on the target device and the logic representation for the redundant processing channel to be implemented with a second type of resources on the target device unused by the processing channel.

5. The method of claim 4, wherein the first type of resources is a first type of look up table (LUT) and the second type of resources is a second type of LUT.

6. The method of claim 1, wherein the processing channel comprises logic for performing one or more functions.

7. The method of claim 1, wherein placing the processing channel is performed according to a third set of constraints, and placing the redundant processing channel is performed according to a fourth set of constraints.

8. The method of claim 1, wherein routing the processing channel is performed according to a third set of constraints, and routing the redundant processing channel is performed according to a fourth set of constraints.

9. The method of claim 1, wherein synthesizing the logic representation for the redundant processing channel is performed in response to a user input indicating that a redundant processing channel is desired.

10. The method of claim 1, wherein the first set of constraints and the second set of constraints are input by a user.

11. The method of claim 1, wherein the first set of constraints and the second set of constraints originate outside the HDL and are automatically applied to the processing channel and the redundant processing channel without input by a user.

12. A method for designing a system on a target device, comprising:
    generating a processing channel from a description of the processing channel in hardware description language (HDL);
    generating a redundant processing channel, functionally equivalent to the processing channel, from a description of the redundant processing channel in HDL, wherein in response to identifying a redundant pairing of the processing channel and the redundant processing channel the processing channel is generated according to a first set of constraints and the redundant processing channel is generated according to a second set of constraints, wherein the first set and the second set of constraints include synthesis constraints, and wherein the identifying is performed by a redundancy identification unit.

13. The method of claim 12, wherein the first set of constraints and the second set of constraints include placement constraints.

14. The method of claim 12, wherein the first set of constraints and the second set of constraints include routing constraints.

15. The method of claim 12, wherein generating the processing channel according to the first set of constraints and generating the redundant processing channel according to the second set of constraints results in the processing channel to register data differently than the redundant processing channel.

16. The method of claim 12, wherein generating the processing channel according to the first set of constraints and generating the redundant processing channel according to the second set of constraints results in the processing channel to be implemented with a first type of resources and the redundant processing channel to be implemented with a second type of resources on the target device unused by the processing channel.

17. The method of claim 12, wherein generating the processing channel according to the first set of constraints and generating the redundant processing channel according to the second set of constraints results in the processing channel being placed at a first location on the target device and the redundant processing channel to be placed at a second location on the target device a predetermined distance away from the first location.

18. A system designer, comprising:
    a synthesis unit that generates a logic representation for a processing channel from a description of the processing channel in hardware description language (HDL) according to a first set of synthesis constraints, and that generates a logic representation for a redundant processing channel, functionally equivalent to the processing channel, from the description of the processing channel in HDL according to a second set of synthesis constraints, wherein the first set and the second set of constraints include synthesis constraints; and a placement unit that places the logic representation for the processing channel and the logic representation for the redundant processing channel.

19. The system designer of claim 18, wherein the synthesis unit generates the logic representation for the redundant processing channel in response to a user input indicating that a redundant processing channel is desired.

20. The system designer of claim 18, wherein the first set of constraints and the second set of constraints are input by a user.

21. The system designer of claim 18, wherein the first set of constraints and the second set of constraints originate outside the HDL and are automatically applied to the processing channel and the redundant processing channel without input by a user.

22. A method for designing a system on a target device, comprising:

synthesizing a logic representation of a processing channel and a redundant processing channel, functionally equivalent to the processing channel, from a description of the processing channel in hardware description language (HDL), wherein the synthesizing is performed by a synthesis unit;

placing and routing the processing channel according to a first set of routing constraints; and placing and routing the redundant processing channel according to a second set of routing constraints.

23. The method of claim 22, wherein the first set of routing constraints specify a first class of routing resources for the processing channel, and the second set of routing constraints specify a second class of routing resources for the redundant processing channel.

24. The method of claim 22, wherein the first and second set of routing constraints specify different timing constraints for the processing channel and the redundant processing channel.

* * * * *